(12) United States Patent
Liess et al.

(10) Patent No.: US 8,192,074 B2
(45) Date of Patent: Jun. 5, 2012

(54) METHOD AND APPARATUS FOR CORRECTING THE OUTPUT SIGNAL OF A RADIATION SENSOR AND FOR MEASURING RADIATION

(75) Inventors: Martin Liess, Wiesbaden (DE); Juergen Schilz, Niedernhausen (DE)

(73) Assignee: Excelitas Technologies GmbH & Co KG, Wiesbaden (DE)

( * ) Notice: Subject to any disclaimer, the term of this patent is extended or adjusted under 35 U.S.C. 154(b) by 811 days.

(21) Appl. No.: 12/065,240

(22) PCT Filed: Aug. 28, 2006

(86) PCT No.: PCT/EP2006/008402
§ 371 (c)(1),
(2), (4) Date: Oct. 17, 2008

(87) PCT Pub. No.: WO2007/025697
PCT Pub. Date: Mar. 8, 2007

(65) Prior Publication Data
US 2009/0219971 A1    Sep. 3, 2009

(30) Foreign Application Priority Data
Aug. 30, 2005   (DE) .................... 10 2005 041 050

(51) Int. Cl.
*G01K 15/00* (2006.01)

(52) U.S. Cl. .......................... 374/2; 250/338.1
(58) Field of Classification Search .............. 374/2, 120, 374/121, 129; 250/338.1
See application file for complete search history.

(56) References Cited

U.S. PATENT DOCUMENTS

| 4,900,162 | A  | * | 2/1990  | Beckman et al. ............. 374/132 |
| 5,378,873 | A  | * | 1/1995  | Katzmann ..................... 374/183 |
| 6,414,310 | B1 | * | 7/2002  | Smith ........................ 250/338.1 |
| 6,565,254 | B2 |   | 5/2003  | Sato et al. |
| 6,821,016 | B2 |   | 11/2004 | Sato et al. |
| 6,908,224 | B2 | * | 6/2005  | Schneider et al. ................ 374/1 |
| 2009/0086788 | A1 | * | 4/2009 | Khaliullin ......................... 374/1 |
| 2011/0019713 | A1 | * | 1/2011 | Sinha et al. ....................... 374/1 |
| 2011/0125444 | A1 | * | 5/2011 | Topham et al. .................... 374/2 |

FOREIGN PATENT DOCUMENTS

| DE | 68929426      | T2 | 7/2003 |
| DE | 10341142      | A1 | 3/2005 |
| DE | 102004028022  | A1 | 12/2005 |
| DE | 102004028022  | B4 | 12/2005 |
| DE | 102004028032  | A1 | 12/2005 |

* cited by examiner

*Primary Examiner* — G. Bradley Bennett
(74) *Attorney, Agent, or Firm* — Peter A. Nieves; Sheehan Phinney Bass + Green PA

(57) ABSTRACT

A method for correcting the output signal of a radiation sensor 20 includes obtaining two or more temperature signals from a corresponding number of measurements of quantities at different times and/or different locations relating to the temperature of the sensor, and correcting the output signal with reference to said temperature signals.

25 Claims, 5 Drawing Sheets

METHOD AND APPARATUS FOR CORRECTING THE OUTPUT SIGNAL OF A RADIATION SENSOR AND FOR MEASURING RADIATION

CROSS-REFERENCE TO RELATED APPLICATIONS

This application is the National Stage of International Application No. PCT/EP2006/008402, International Filing Date, Aug. 28, 2006, which designated the United States of America, and which international application was published under PCT Article 21(2) as WO Publication No. WO 2007/025697 A1 and which claims priority from German Application No. 10 2005 041 050.2, filed Aug. 30, 2005.

BACKGROUND

1. Field

The disclosed embodiments relate to a method and an apparatus for correcting the output signal of a radiation sensor and for measuring radiation. Related disclosures can be found in DE 102 004 028 032.0 and DE 102 004 028 022.3.

2. Brief Description

Radiation sensors transform electromagnetic radiation into an electrical signal. This may be accomplished, for example, by thermopiles, bolometers or the like. The radiation sensed by them is often infrared radiation (wavelength larger than 800 nm). Radiation sensors of this type are often used for contactless temperature measurement. The body of which the temperature is to be measured emits radiation in dependence of its temperature. The radiation is the more intense the higher the temperature of said body is. Accordingly, the emitted infrared radiation of a body may be used for contactless measuring its temperature. The details thereof will be explained with reference to FIG. 1.

FIG. 1 shows a sensor element 10. It comprises a frame 2 which is a support for a membrane 3. The frame 2 surrounds an opening 4 which may have rectangular or round cross-section depending on particular necessities. The membrane 3 serves to thermally insulate the actual sensing portion 1 formed on the top surface of the membrane 3 from the surrounding as far as possible. From the top surface, the sensing portion 1 of the sensor element 10 receives radiation, preferably infrared radiation, as indicated by two arrows IRn and IRs. IRs indicates the desired signal radiation from the body to be measured. However, the sensing portion receives also noise radiation, as indicated by arrow IRn. This may come from components in the immediate vicinity of the sensing portion, for example the housing of the sensor, shielding members, or the like. The sensing portion 1 itself cannot distinguish which kind of radiation impinges on its surface. It will transform both of them into an electrical signal.

If the sensing portion 1 comprises a thermopile consisting of a sequence of hot and cold contacts, then the measurement principle is that the incident radiation will transform into a temperature change (usually rise of temperature) at the hot ends/contacts 1a. In FIG. 1, the ends above the opening 4 are the hot ends 1a of the thermopile, whereas the ends above the frame 2 are the cold ends 1b. For enhancing measurement sensitivity, the hot and cold ends may be covered with auxiliary layers, particularly an absorbing layer 5 above the hot ends 1a and a reflecting layer 6 above the cold ends 1b. The incident radiation causes a difference in temperature between the hot and the cold ends, and in dependence of this temperature difference, the thermopile will generate an electrical signal.

Another noise source is indicated by the thick arrow Ta. It is heat conduction through the various physical bodies. 7 is a substrate such as a silicon wafer, a ceramics baseboard or a printed circuit board on which the sensor element 10 of FIG. 1 is mounted. Changes in the ambient temperature will communicate through heat conduction through the support 7, frame 2, and membrane 3 to the sensing portion 1. Heat conduction also takes place between the surrounding atmosphere and the sensor element 10 and the sensing portion 1 thereof, but heat conduction through the substrate 7 is usually much stronger in effect. Since the cold ends are usually differently located with respect to the frame 2 as the warm ends, the former will experience a change in ambient temperature earlier than the warm ends. The hot contact on the membrane of the sensor element is usually the last relevant component that experiences a temperature change because it is usually the thermally best isolated part of the relevant measurement system.

Thus, a change in ambient temperature will first be experienced by the cold ends and only later by the warm ends of the sensing portion 1. Accordingly, through heat conduction a temperature difference builds up between the hot and the cold ends which has nothing to do with the temperature difference caused by the signal infrared radiation. The temperature difference caused by heat conduction will be the larger the faster the temperature change is, because in a fast transition through a temperature range the sensor element will not go through the temperature range in a state close to thermal equilibrium. It will not have almost the same temperature everywhere on the sensor. Rather, there will be temperature differences between the hot and the cold ends which serve to cause errors in the output signal and accordingly in the measured temperature.

The above two mentioned German patent applications of the same applicant propose various ways for overcoming erroneous measurements caused by temperature shocks of the ambience. One proposal is to equalize the thermal flow towards the hot and the cold ends by arranging them suitably with respect to the frame 2 on the one hand side, and on the other hand side by appropriately designing the auxiliary layers 5 and 6 (absorbing layer, reflecting layer). However, in various applications this cannot fully eliminate erroneous measurement. In many cases, it is desired to have the cold ends above frame 2 because it serves as a thermal mass and has the effect of keeping the cold ends at a steady temperature when measurement is made. Accordingly, there is a systematic desire for an asymmetric arrangement of the hot and cold ends with respect to the frame 2, and the design of the auxiliary layers cannot fully compensate this for changes of the ambient temperature.

Another proposal is to design the housing of the sensor element 10 such that noise radiation as symbolized by arrow IRn is blocked from the sensing portion as far as possible.

But while the above proposals have significant advantageous effects particularly by appropriately designing the components that are needed anyway (sensor element 10 including frame, membrane, thermopile, auxiliary layers, and also the housing of the sensor), there are nevertheless situations where an even more sophisticated compensation of error sources particularly at changing ambient temperature ("thermal shock") is desired.

SUMMARY

It is the object of the disclosed embodiments to provide a method and an apparatus for correcting the output signal of a radiation sensor and for radiation measurement with high accuracy.

This object is accomplished in accordance with the feature of the independent claims. Dependent claims are directed on preferred embodiments of the disclosed embodiments.

A method of correcting the output signal of a radiation sensor comprises the steps of obtaining two or more temperature signals from a corresponding number of measurements of quantities relating to the temperature of the radiation sensor, and correcting the output signal with reference to said temperature signals.

A method for measuring the temperature of an object comprises the steps of obtaining an output signal from a radiation sensor receiving radiation from said object in accordance with said radiation impinging on said sensor, and correcting the output signal with a method as mentioned above.

An apparatus for measuring radiation comprises a sensor element for receiving radiation and transforming it into an electrical output signal, and means for obtaining two or more temperature signals from a corresponding number of measurements of quantities relating to the temperature of the apparatus. Said two or more temperature signals are used for correcting the output signal. The temperature can be determined from said corrected output signal.

According to the disclosed embodiments, two or more temperature measurements of the temperature of the sensor or the sensor element or the sensing portion are obtained for obtaining a measure for the thermal imbalance. The two or more temperature measurements may be spaced in locus and/or spaced in time. In any case, they will reflect thermal dynamics relating to the sensor temperature and allow conclusions relating to the thermal imbalance caused to the hot contacts $1a$ and the cold contacts $1b$ of the sensing portion $1$.

In an appropriate evaluation mechanism, these temperature measurements can be evaluated by providing correction values for the output signal from said temperature measurements, and/or by immediately correcting the output signal of the sensor element with reference to said temperature measurements.

BRIEF DESCRIPTION OF THE DRAWINGS

In the following, embodiments of the disclosed embodiments will be described with reference to the attached drawings, in which.

DETAILED DESCRIPTION

Figure 1:
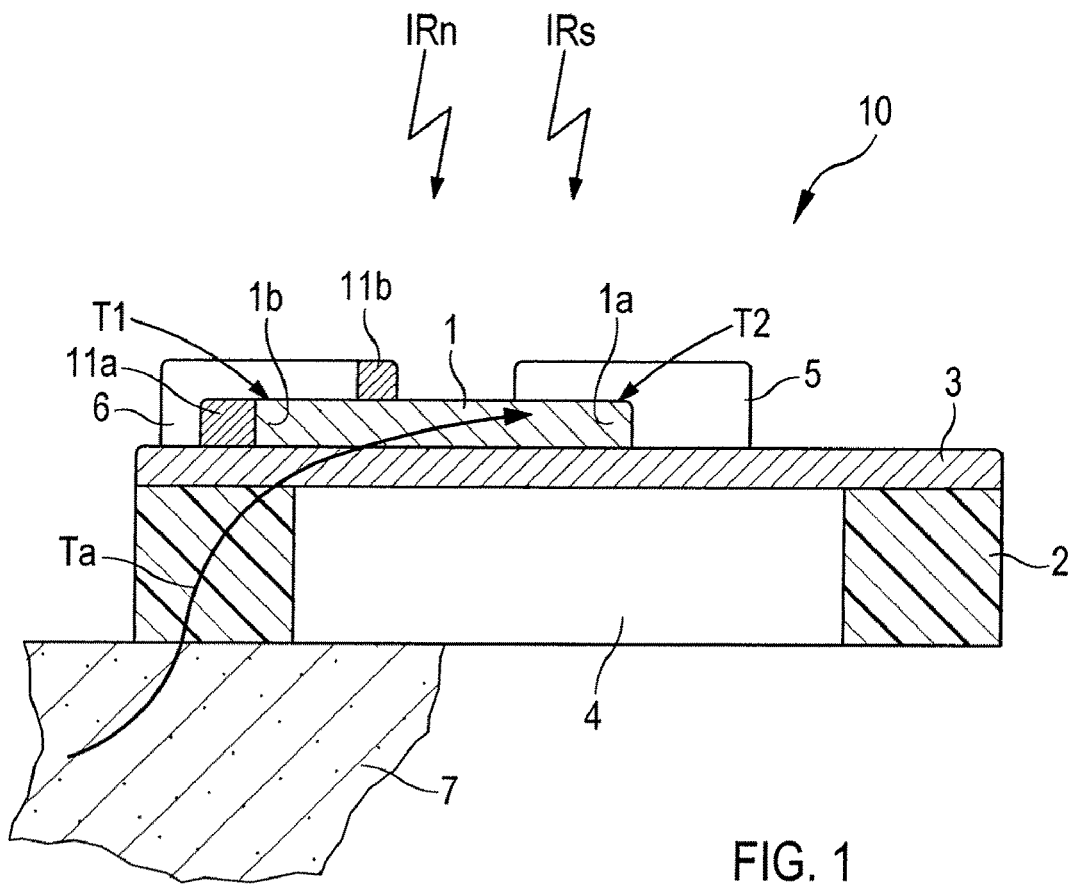
FIG. 1 is a schematic sectional view of an embodiment of the sensor element incorporating features of the disclosed embodiments.

FIG. 1 shows a sectional view of a sensor element $10$ formed in accordance with an embodiment of the disclosed embodiments. $2$ is a frame formed by micromachining, for example from a silicon wafer. It may have a rectangular outer cross section. An opening $4$ with rectangular or partially or fully rounded cross section is surrounded by the frame $2$. A membrane $3$ spans across the opening $4$. On the membrane $3$, the sensing portion $1$ is formed. It may be a thermopile with a couple of warm contacts $1a$ and cold contacts $1b$. The warm contacts $1a$ are usually located above the opening $4$. The cold contacts may be located above the frame $2$ or also above the opening $4$, depending on particular necessities. In measurement, the warm contacts $1a$ have a temperature T2, whereas the cold contacts $1b$ have a temperature T1. From said temperature difference, the actual electrical signal will be determined. An absorbing layer $5$ for enhancing absorption may be provided above the warm contacts $1a$, and a reflecting layer $6$ for preventing absorption may be provided above the cold contacts $1b$.

According to one embodiment of the disclosed embodiments, one or more temperature sensors $11$ may be provided on the sensor element $10$. They may be provided on an arbitrary position of the sensor element $10$, but preferably distant from the hot contacts $1a$, e.g. close to the cold contact $1b$ and/or inbetween cold contact $1b$ and warm contact $1a$.

For describing one embodiment of signal evaluation of the disclosed embodiments, it is in the following assumed that one temperature sensor $11$ is provided close to the cold contacts $1b$ and another one is provided in between cold and warm contacts, as shown in FIG. 1. If, caused by a thermal shock, a temperature change sweeps through the sensor element $10$ as indicated by thick arrow Tn, this will first by experienced by the cold contact $1b$ and by the accordingly allocated temperature sensor $11a$, and thereafter it will be experienced by the temperature sensor $11b$ located between warm and cold contacts. Accordingly, the two temperature sensors will show different temperatures, they show a gradient over locus. This gradient is not caused by the radiation to be measured. Rather, it reflects the thermal shock experienced by the sensor element $10$ and particularly, the thermal imbalance (noise imbalance) caused by the change of ambient temperature in addition to the thermal imbalance (signal imbalance) caused by the infrared radiation from the objects to be measured.

A temperature sensor $11$ may have own electrical terminals through which its signal can be interrogated. It can be, for example, a temperature resistant resistor or similar devices.

The above embodiment measures the temperature at two locations on the sensor element $10$, itself. However, it is not necessary to measure the thermal imbalance immediately at the sensor element itself. Rather, it may also be measured between the sensor element $10$ and another component, for example the substrate $7$ because also such an imbalance is a measure for the thermal inequilibrium caused by change in ambient temperature (thermal shock). Accordingly, there need not be two sensor elements provided on the sensor element $10$ itself. Rather, one may be provided somewhere on the sensor element $10$, and another in another component of the sensor.

Figure 2:
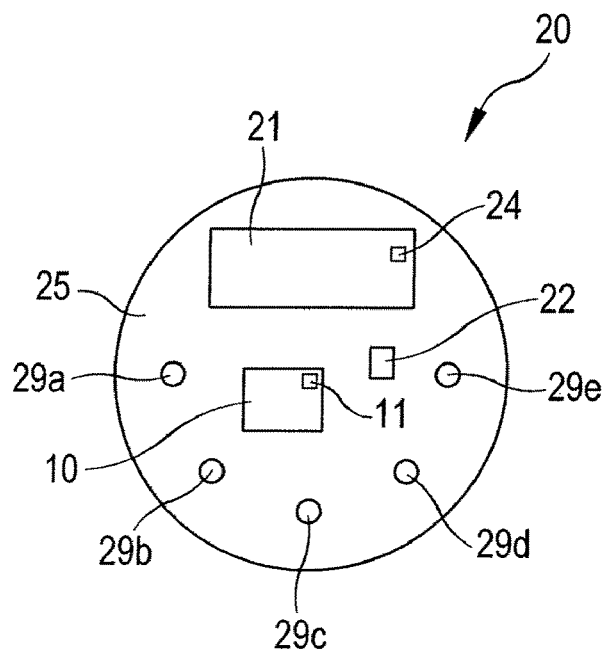
FIG. 2 is a schematic plain view of a sensor formed in accordance with an embodiment of the disclosed embodiments.

FIG. 2 shows an embodiment of a sensor $20$ in a schematically way. It is a plain view on a base plate of a possibly housed sensor $20$ with the housing, for example a cap member, being removed. $10$ symbolizes the sensor element of FIG. 1 with a temperature sensor $11$ thereon. $21$ symbolizes an evaluation electronics which may be an ASIC (application specific integrated circuit). $29a$ to $e$ symbolize contact points for sensor terminals. Not shown is a wiring between sensor element $10$, evaluation electronics $21$ and contacts $29a$ to $e$. $22$ symbolizes a temperature sensor on the base plate of the sensor $20$, said base plate having reference numeral $25$ in FIG.

2. It may be component 7 in FIG. 1. The evaluation electronics 21 may itself have a temperature sensor 24 formed thereon.

In the embodiment shown in FIG. 2, at least two of the temperature sensors 11, 22 and 24 may be used. They are provided on suitable differing locations on the sensor 20, and they will show a temperature gradient over locus not being caused by the signal infrared radiation to be measured, but by a change of ambient temperature. Again, such a gradient can be used for correcting the output signal of the sensor element 10. For evaluation, one may for example consider the temperature difference between sensor elements 24 and 11, or between 22 and 11, or between 24 and 22. In the later option, it is not at all necessary to provide a temperature sensor on the sensor element 10 itself.

In an embodiment of the disclosed embodiments, the apparatus for measuring radiation may comprise only a sensor as schematically shown in FIG. 2, said sensor having the sensor element 10 and means 21 for correcting the output signal. Said means 21 for correcting the output signal may be an ASIC formed within sensor 20. ASIC 21 receives the raw output signal of sensor element 10, obtains the temperature measurements, and corrects the raw output signal of sensor element 10 and outputs the correct signal to the terminals 29a to e.

At least one temperature signal relating to the temperature of the sensor or to one or more components of the sensor and used for correction may be obtained from a measurement outside the sensor, for example a measurement on the circuit board where the sensor is mounted. The signal may then be inputted to the sensor in an appropriate manner or it may be used outside the sensor on or with quantities output from the sensor.

In another embodiment of the disclosed embodiments, the apparatus for measuring radiation may be a larger system in which the raw signal from the sensor element 10 (perhaps amplified and calibrated in sensor 20) is transmitted away from the sensor 20 towards an external circuit for further processing there.

The sensor element 10 may have a size of less than 3 mm*3 mm, preferably less than 2 mm*2 mm. The sensor 20 may have a regular or standardized housing such as a TO5-housing. Multiple sensor elements 10 may be provided in one sensor. Each output signal thereof may be corrected as described. Signal multiplexing may be used for this as well as for signal output.

Figure 3:
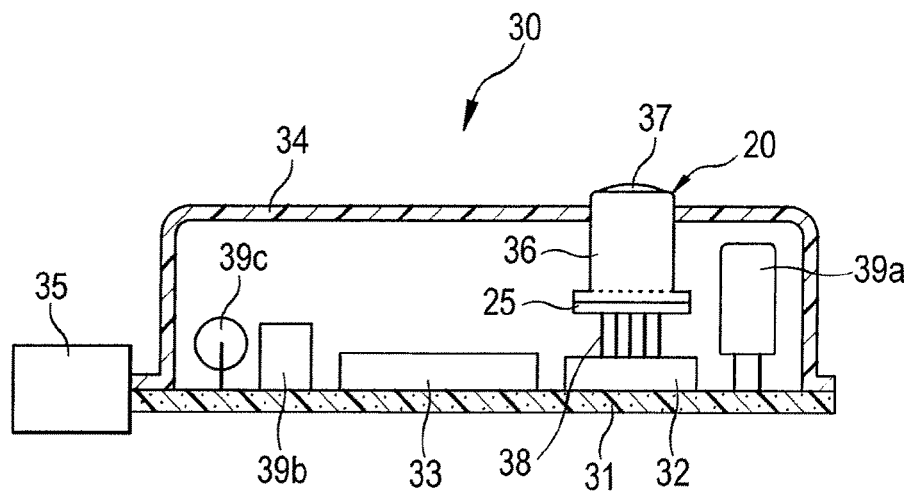
FIG. 3 is a schematic sectional view of an apparatus for measuring the temperature.

FIG. 3 shows an embodiment of an electronic component which schematically shows in cross section a housed circuit. 31 is a baseboard, for example a printed circuit board. 32 may be a socket for a radiation sensor. 20 symbolizes the radiation sensor itself in the side view, it shows the sensor base plate 25, a cap 36 housing and closing the sensor, a radiation entrance window 37 which may comprise a focusing element such as a lens or a mirror, and terminals 38 received by the socket 32 or immediately soldered to the circuit board 31. 39a to c symbolize other circuit elements such as resistors, capacitors, and the like. 33 may be again an ASIC or a digital component such as a microprocessor. 35 symbolizes a connector for transmitting away signals and receiving signals and for power supply.

The temperature signals obtained from the at least two measurements within sensor 20 may be transmitted away from sensor 20 together with the raw (and possibly amplified and calibrated) output signal of the sensor element 10. These signals may be processed for example in ASIC or microprocessor 33, and corrected values are further used or outputted via connector 35.

In yet another, not shown embodiment, circuit 30 as shown in FIG. 3 may also be some kind of preprocessing, signal formatting and process control, and signals corresponding to the temperature measurements and the raw output signal (perhaps calibrated and amplified) of the sensor element 10 are transmitted away from circuit 30 towards a regular computer for further processing there.

In the following explanations, it is assumed that the entire correction is made within sensor 20 of FIG. 2. However, as indicated above, it may also be made in external components.

Figure 4:
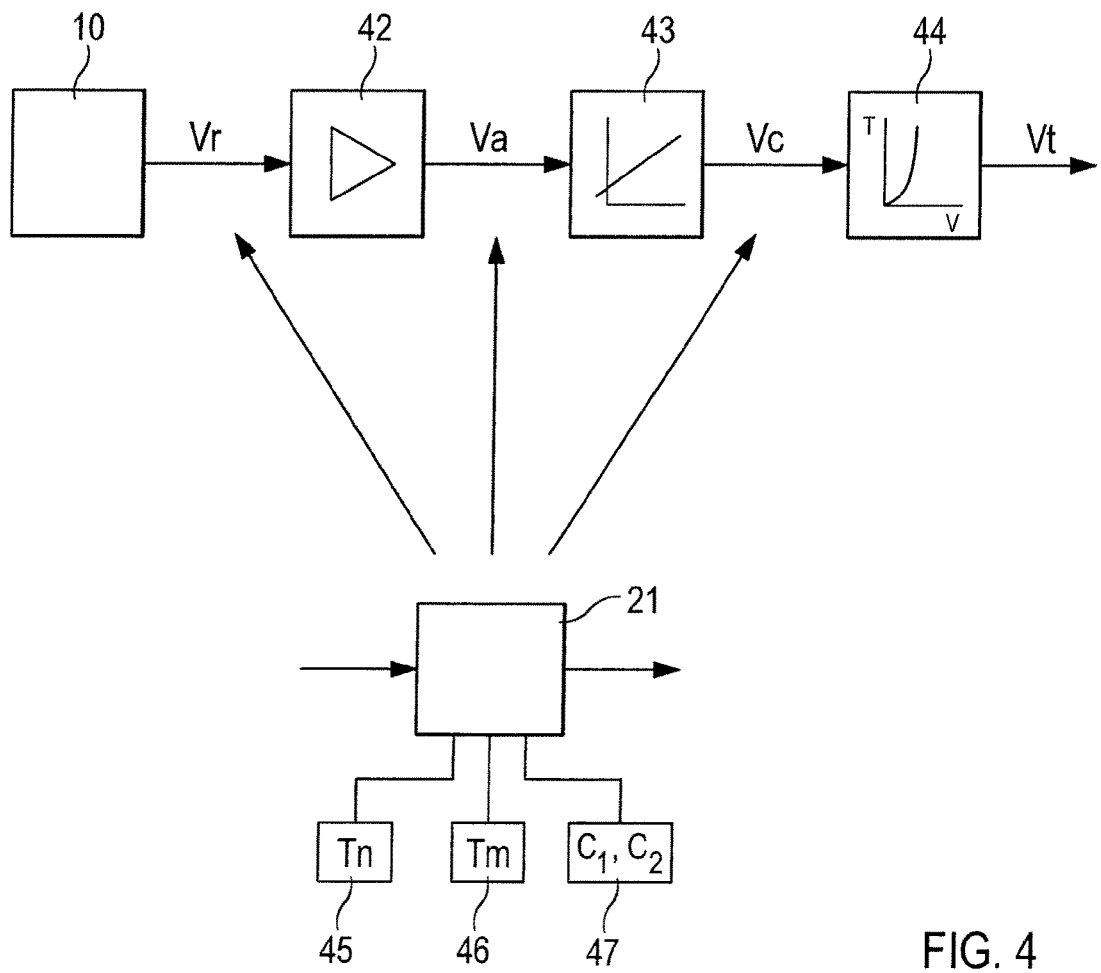
FIG. 4 is a schematic structure of the signal processing.

FIG. 4 shows a general signal flow. 10 indicates the sensor element, which outputs a raw signal (voltage) Vr. This signal Vr may be amplified in an amplifier 42 giving an amplified voltage Va, which may further linearly be calibrated for offset and sensitivity in a calibration 43, this giving a calibrating voltage Vc. A transformation means 44 transforms the calibrating voltage Vc into a voltage reflecting the temperature Vt of the object to be measured. Preferably, prior to transformation means 44, the correaction of the obtained signals as described above is made. In FIG. 4, this is schematically shown by box 21 representing the correcting means 21 as shown in FIG. 2, which may be the ASIC within sensor 20 or an external component as shown with reference numeral 33 in FIG. 3 or a (not shown) usual computer.

The correction means 21 may be preferably inserted between sensor element 10 and amplifier 42 or between amplifier 42 and calibration 43 or between calibration 43 and transformation means 44. The transformation means may involve Botzmanns T^4 dependency. Correcting means 21 receives the uncorrected (but perhaps already amplified and/or calibrated) signal, corrects it as mentioned above in accordance with the at least two measurements of temperature of the sensor or a particular component thereof, and outputs it for further processing. Correction means 21 receives the at least two temperature measurements Tn and Tm as indicated with boxes 45 and 46 and may further receive calibration values 47.

The correction may be performed on the analog or on the digital side. Likewise, calibration 43 may be analog or digital.

Amplification 42 and calibration 43 may be performed in a unified component or may be reversed in order as compared to what is shown in FIG. 4. Likewise, one or more of the boxes 42, 43 and 44 may be incorporated in the correcting means 21 to form a unified piece of hardware such as the mentioned ASIC.

So far, temperature gradients over locus were described. In another embodiment of the disclosed embodiments, a temperature gradient over time is obtained. It may then not be necessary to obtain temperature measurements at two or more locations. This embodiment reflects the fact that a temperature gradient in time correlates strongly with a temperature gradient over locus. Looking at the entire measuring apparatus when it experiences a temperature shock, this shock will cause a temperature gradient over locus with the peripheral components experiencing the temperature change first, and more central components experiencing the temperature change later, thus rendering a gradient over locus, as explained above. By the way, the innermost component in this respect will usually be the hot contact on the membrane of the sensor element, because usually this is the thermally best isolated part of the relevant measurement system.

However, looking at one particular locus of the sensor 20 as shown in FIG. 20 or sensor element 10 as shown in FIG. 1, this locus will almost always also experience a temperature gradient over time when a temperature shock through change of ambient temperature is experienced. As long as the entire measurement system is in thermal equilibrium, its components have the same temperature and won't show a gradient over locus, and their temperature is stable and won't show a gradient over time, either. However, if a temperature shock is experienced, this will lead both to temperature changes at a particular location and thus giving a temperature gradient over time there, until the new thermal equilibrium is reached, so that also a thermal gradient from two or more temperature measurements spaced in time is suitable for detecting the circumstances that may lead to a temperature difference at hot and cold contacts 1a and 1b of the sensing portion 1 of the sensor element 10 in FIG. 1. Then, only one temperature sensor of those in FIG. 1 may be sufficient, for example sensor 11 provided on the sensor element 10, or sensor 22 provided on the base plate of the radiation sensor, or sensor 24 provided in the correcting means, for example the ASIC. It is justified to assume that in practically all applications the temperature changes of the individual components of the overall sensor 20 will not grossly deviate from each other. Rather, they will be similar. Therefore, measuring a temperature gradient over time at a locus different from the sensor element 10 itself quality reflects the circumstances requiring the correction according to the disclosed embodiments.

In the above, one embodiment was described in which a gradient over locus was obtained, and another embodiment was described, in which a gradient over time was obtained. Generally speaking, locus dependent measurement and time dependent measurement can be combined to evaluate temperature differences both over time and over locus. All these values may then be used for appropriate correction in the correction means 21.

Generally speaking, one way of providing correction to the uncorrected signal is to form a difference between at least two of the obtained temperature values and to apply a correction proportional to the difference additively or multiplicatively to the uncorrected signal. Instead of the temperature values used for forming the above-mentioned difference, values derived from said temperature values may be used, particularly average values. Averaging has the advantage that the useful signal will sum up, whereas noise tends to neutralize itself. Averaging may be particularly used if the gradient over time of the temperature signal is evaluated. Particularly, an auto-regressive average of temperature values measured over time may be acquired according to the formula $$va = k*Ta + (1-k)*vae,$$

wherein va is the average value to be determined, vae is an earlier corresponding average value, Ta is the actually measured temperature value, and k is an averaging coefficient between 0 and 1. The value k is a weighting coefficient that weights the present temperature value Ta in relation to the value vae incorporating the earlier values of Ta. Together, the entire weight is 1. If k is large, then the actual temperature strongly influences the new average value va and the earlier composite value vae has weaker influence thereon, whereas when k is small, the actual temperature Ta only weakly influences va whereas the earlier values incorporated in vae have stronger effect thereon. Therefore, by setting k, one can determine whether the effective time of the average value va is closer to the present or closer to the past. In the extreme, if k is 1, then the history incorporated in the earlier value has no influence at all, because it is multiplied with zero.

If temperature values of different times are desired for obtaining the gradient over time, then one may use two auto-average values as indicated above with different averaging coefficients k such that the one of them is closer to the present value and the other is stronger adhered to the past.

The value k can be selected in view of the time constant of the sensor element 10 (more in detail: the time constant for the hot contacts to react on the temperature change applied through heat conduction from the bottom of the frame). Further, the averaging parameter k can be selected in accordance with the sampling rate of the device 21 performing the correction. And further, the sampling rate can be determined in accordance with said time constant.

Figure 5:
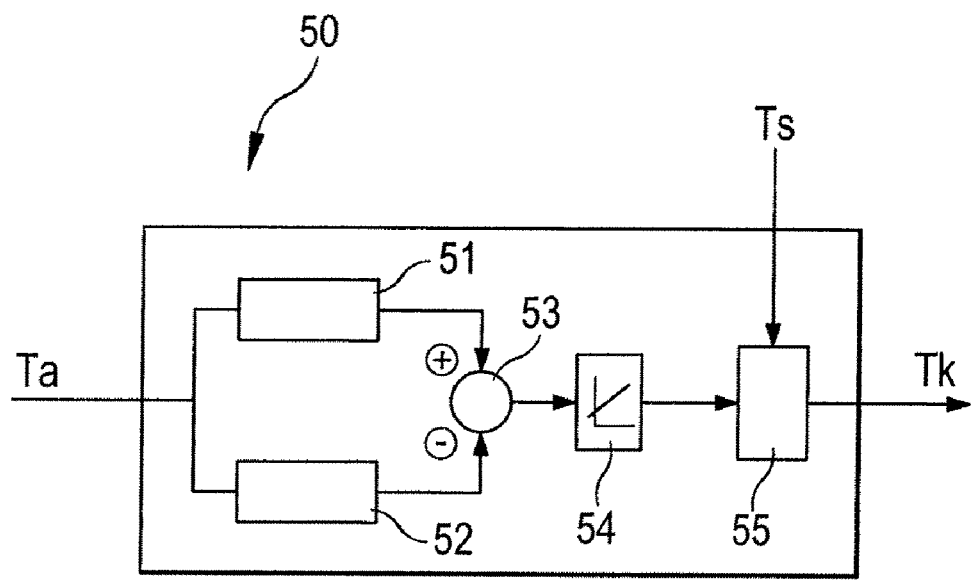
FIG. 5 is a block diagram of a way of processing a temperature signal in a correcting means.

FIG. 5 shows a block diagram of a correcting means 50 for performing the immediate correction. The correcting means may be part of correcting means 21. Its input signals Ta, Ts and output signal Tk may be one or more of the values Tn, Tm, Vr, Va, Vc or Vt in FIG. 4. It receives the signal from the sensor element 10, symbolized as signal Ts in FIG. 5, which may have undergone already some preferably linear processing such as amplification and/or calibration as shown in FIG. 4. Further, correcting means 50 receives signal Ta representing the measured temperature measured by one temperature sensor such as one of reference numerals 11, 22 and 24 in FIG. 2. Register 51 keeps an actual value, and register 52 keeps a past value. 53 is a subtractor in which the earlier value from 52 is subtracted from the later value at 51. The difference goes to a calibration 54 which may perform a preferably linear correction. Then it is applied to the uncorrected temperature signal Ts in box 55. It may be an addition or a multiplication or some kind of nonlinear correction in accordance with the calibrated value leaving box 54. For example, a table may be addressed, the table outputting correction values for correcting Ts. The thus corrected signal Ts leaves box 55 and the correcting means 50 as a signal Tk for further processing, particularly for sooner or later entering box 44 in FIG. 4.

In an embodiment, the value from register 51 is transferred to register 52 after the difference of the registered values was formed, register 51 receives a new value of Ta, and the procedure starts again.

Figure 6:
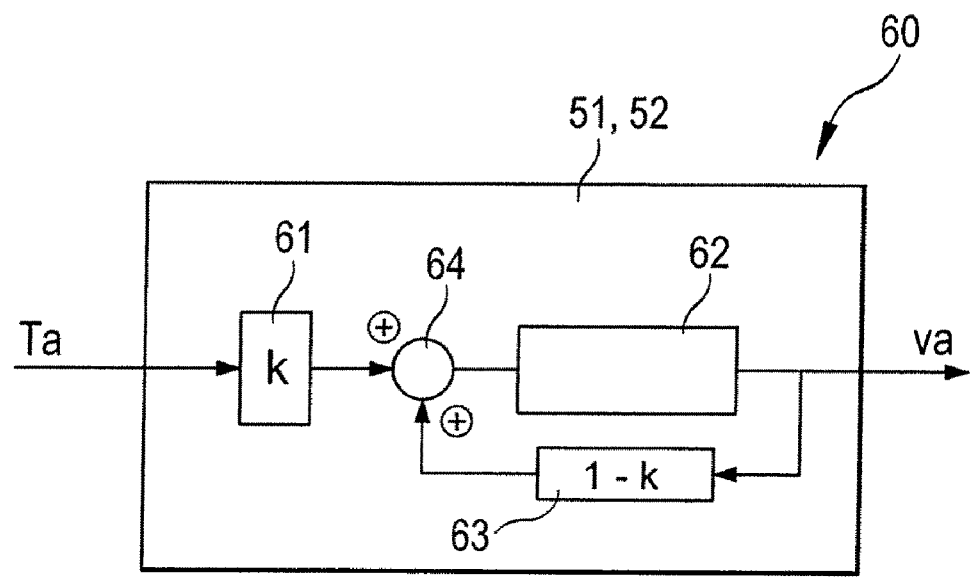
FIG. 6 is a block diagram of how to obtain a particular average value.

So far, with reference to FIG. 5 a procedure was described in which immediate temperature values Ta were used for correction. However, as said above, one or more derived values (derived from the temperature signal Ta) may be used instead. FIG. 6 shows a block diagram of an averaging means 60 that may be used for example as block 51 in FIG. 5 and/or as block 52 in FIG. 5. It forms an autoregressive average as mentioned above. 62 is a register holding a value. Ta is the input of the measured temperature. 61 symbolizes a multiplier to multiply the input value with the averaging coefficient k (0<k≦1), and the result goes to an adder 64 which also receives the content of register 62 multiplied by 1−k in multiplier 63. The sum of both is again written to register 62 and output as an average value va.

Using an autoregressive average has the advantage that not a plurality of registers is necessary for holding past values. Rather, said past values are all contained in the already held average value which is added to the appropriately weighted new temperature value for registering in the same register as the earlier value by overwriting it.

In FIG. 5, both registers 51 and 52 may be replaced by respectively one averager 60 as shown in FIG. 6, but these averagers working with differing averaging coefficients. The one in the top of FIG. 5 has a higher coefficient (closer to 1) and is thus closer to the actual value of Ta, whereas the lower thereof has a smaller value of k (closer to 0) so that its output is closer to the past. Instead of receiving the same inputs Ta from one temperature sensor, such averagers 60 may receive differing inputs from differing temperature sensors as shown in FIG. 2. If they receive different temperature inputs, they may have the same averaging coefficient k.

Figure 7:
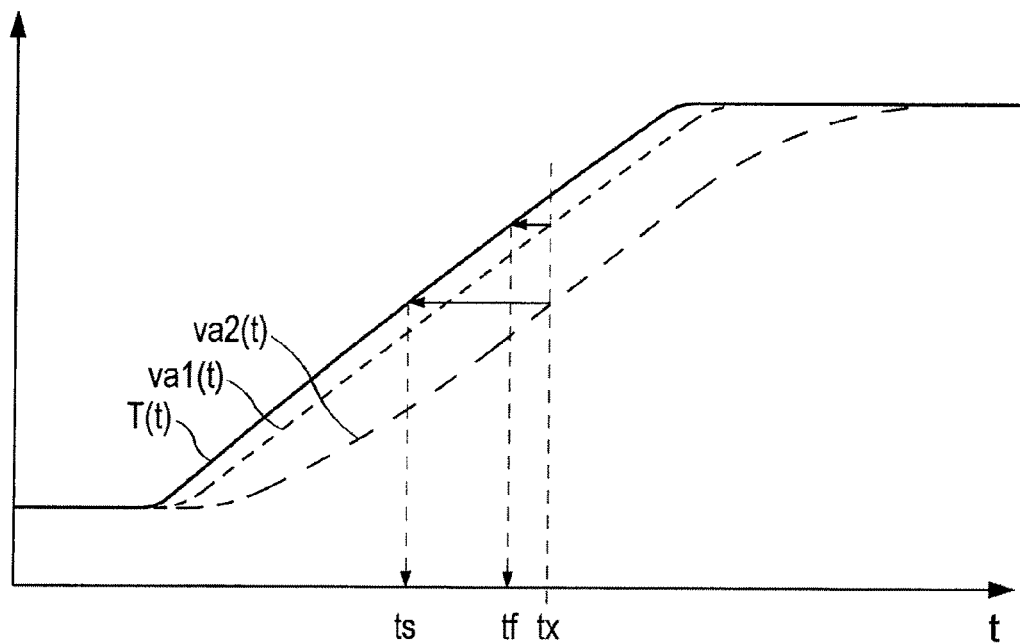
FIG. 7 is a diagram showing typical signal curves.

The result of the FIG. 5 correcting means 50 using two averagers 60 as shown in FIG. 6 with differing averaging coefficients k on the same input Ta is shown in FIG. 7. The curve T(t) symbolizes a temperature change in the temperature as experienced by a temperature sensor 1, 22, 24 as shown in FIG. 2. Curve va1(t) symbolizes the autoregressive average with a higher k (i.e. quicker following T(t)), whereas va2(t) represents the curve of the autoregressive average having a smaller k (thus following curve T(t) slower). If one looks at the respective average values at a particular point of time tx, then it shows that curve va1(t) has a value of the curve T(t) at point of time tf, whereas the slower curve va2(t) has a value of an earlier point of time ts. Accordingly, with the two averaging coefficients k used in the two averagers 60 one can determine to which extent the two obtained average values deviate as regards their effective time.

Figure 8:
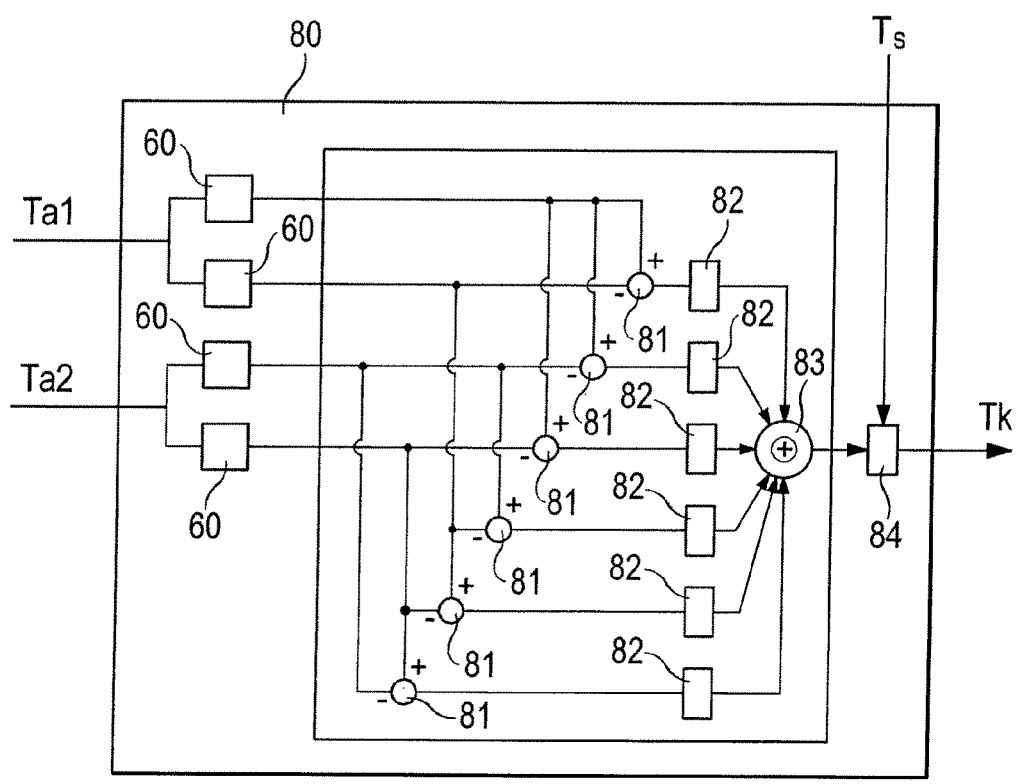
FIG. 8 is a schematic representation of another correcting means.

As long as two values of measured temperature or values derived therefrom are taken, only one difference thereof can be formed. This difference can be set appropriately by numerically adjusting the averaging coefficients used in boxes 61 and 63, respectively, and also by adjusting the coefficients in boxes 42, 43 and 54. However, it is also possible to use more than two temperature values or more than two derived values derived from temperature values. In a preferred embodiment, the temperature of the sensor 20 or sensor element 10 may be measured at two or more different locations and with two or more different time references, such as different points of time of different measurements or different effective times of different autoregressive averages as mentioned above. One obtains then at least four values which allow formation of at least six differences amongst them. FIG. 8 shows a corresponding embodiment.

80 is a correcting means functionally corresponding to correcting means 50 in FIG. 5. It receives a signal Ta1 representing the temperature at a first location, and a signal Ta2 representing the temperature at a second location. Both signals respectively may go through a fast and a slow autoregressive averaging process as described with reference to FIG. 6, thus rendering four values relating to different locations at different times. Instead of the averagers 60, also storage registers may be used with an appropriate renewal structure behind them.

Accordingly, four values are available for forming differences amongst them at subtractors 81, these differences reflecting a gradient over locus and/or a gradient over time. In a calibration process, there may coefficients 82 for each of said differences be determined for properly taking into account said difference for correcting the temperature signal to be corrected Ts from the sensor in order to produce the corrected temperature signal Tk. This may be accomplished in a calibration process in which a sensor in its built-in state is exposed to a defined change of ambient temperature so that the respective sensor signals are obtained (Ts from the radiation sensor on the one hand side and Ta1, Ta2 at least on the other hand side). By a heuristic optimization process performed by numerically processing and comparing the respective data, coefficients 82 for the respective differences can be obtained and permanently stored in the correcting means 80 as shown in FIG. 8, preferably by writing them into PROM-like registers. The weighted differences may be added in an adder 83 and used for correction of Ts in box 84 to obtain Tk.

Generally speaking, coefficients used in the above described techniques may be obtained by calibrating an individual sensor, possibly in its built-in state, in a defined environment in which the respective outputs are monitored and the coefficients are set such that deviation between actual and target values become minimum. Coefficients may be permanently written into the sensor, e.g. into the correcting means 21.

Figure 9:
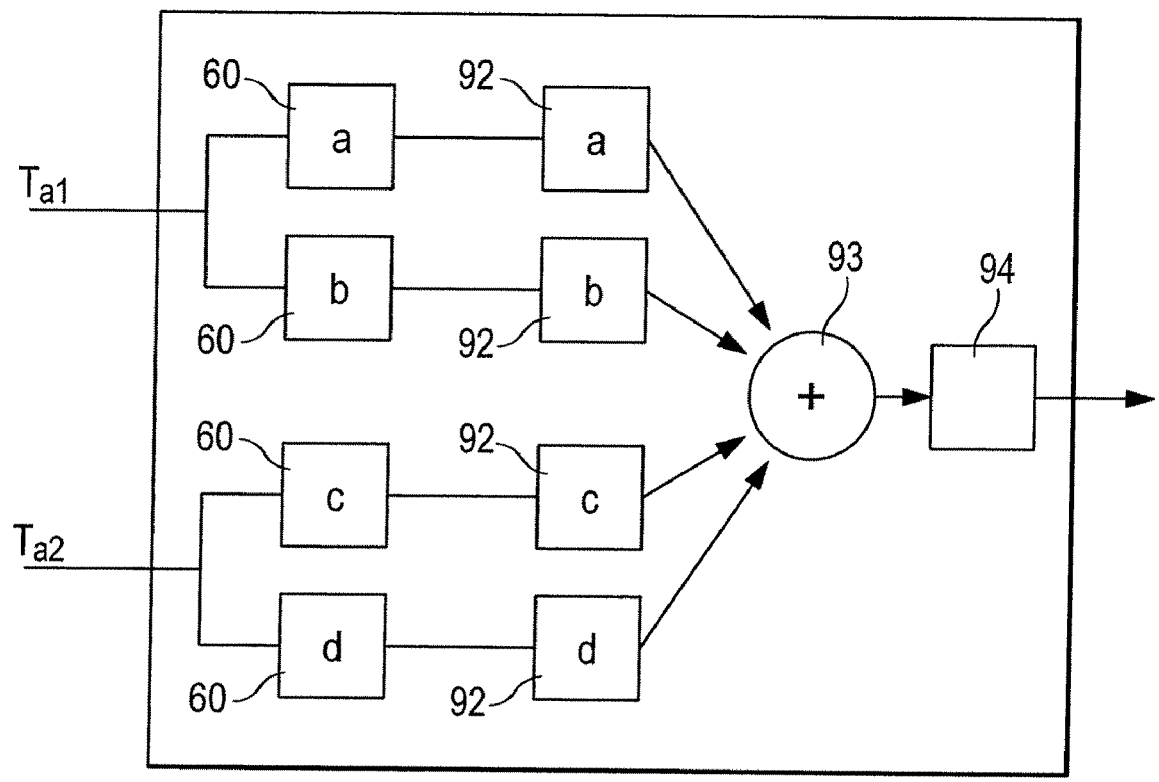
FIG. 9 is a schematic representation of yet another correcting means.

Instead of the structure of FIG. 8 also the one in FIG. 9 can be used. Behind this is the idea that the differences formed in FIG. 8 are, and go through, linear operations so that instead of separately forming and weighting the differences and adding them, also their input values can be weighted and added. Each value leaving the boxes 60 in FIG. 8 contributes to three differences either on the (+)-side thereof or on the (−)-side. Assume that one of the values is in two differences weighted with 0.20 and 0.14, respectively, on the (+)-side, and in one difference weighted with 0, 15 on the (−)-side. Then its entire weight in the final result is 0.20+0.14−0.15=0.19. A thus obtained weighting coefficient may be negative. This weight can be applied to the output of averagers 60 or to corresponding values, as shown in FIG. 9, and the weighted results are summed up. From a computational point of view, this is less complex than the embodiment in FIG. 8 and renders the same result.

For using the at least two temperature measurements for correction purposes, one can evaluate them in any suitable manner for obtaining a correction reflecting the temperature dynamics experienced by the sensing portion 1 of the sensor element. So far, subtractions were described as evaluation (reference numerals 53, 83). But other evaluations may be used instead for rendering results reflecting said temperature dynamics and particularly a noise temperature difference as described with reference to FIG. 1.

For properly performing the respective tasks, the correcting means 21 in FIG. 2 may have one or more clocked tasks which are repeatedly executed. All required processings may be compiled to one big task executed with a suitable repetition rate. Such a task may comprise data acquisition (from at least of sensor element 10, and from one or more temperature sensors 11, 22, 24), calibration, subtraction, and the like, as described above.

The invention claimed is:

1. A method for correcting the output signal of a radiation sensor, comprising:
    obtaining two or more temperature signals from a corresponding number of measurements of quantities relating to the temperature of the sensor or relating to one or more components of the sensor,
    forming a difference value from at least one derived value derived from said temperature signals,
        wherein the derived value is an average value determined using:

$$va = k*Ta + (1-k)*vae,$$

where va is the average value, vae is an earlier corresponding average value, Ta is the actually measured temperature value, and k is an averaging coefficient with $0 < k \leq 1$, and
    correcting the output signal with reference to said temperature signals using the difference value.

2. The method according to claim 1, wherein correcting the output signal is made also with reference to one or more calibration values.

3. The method according to claim 1, in which the measurements are spaced in time.

4. The method according to claim 3, wherein the time difference is selected in accordance with the time constant of the sensor or of a component thereof.

5. The method according to claim 1, in which the measurements are spaced in locus.

6. The method according to claim 1, comprising the steps of determining a correction value with reference to said temperature signals, and correcting the output signal with reference to said correction value.

7. The method according to claim 1, in which two average values are determined, said two average values having different averaging coefficients, wherein for correction the difference value of said two average values is formed.

8. The method according to claim 1, in which the temperature signals are transmitted away from the sensor for external correction of the output signal of the radiation sensor.

9. The method according to claim 1, in which one or more of the temperature signals or a derived value derived from said temperature signals are stored in the sensor and the output signal of the radiation sensor is corrected within the sensor and is output therefrom.

10. The method according to claim 1, comprising one or more of the following features:
- the sensor comprises a thermopile sensor element, preferably having cold and warm contacts, the warm contacts preferably located on a membrane,
- the sensor comprises an ASIC for obtaining the two or more temperature signals, and/or for correcting the output signal with reference to said temperature signals,
- the sensor element is adapted to convert IR radiation into an electric signal.

11. A method for measuring a temperature, comprising: obtaining an output signal from a radiation sensor, and correcting said output signal with the method of claim 1.

12. An apparatus for measuring radiation, comprising
a sensor element for receiving radiation and transforming it into an electrical output signal,
means for obtaining two or more temperature signals from a corresponding number of measurements of quantities relating to the temperature of the apparatus, and
means for forming a difference value from at least one derived value derived from said temperature signals,
wherein the derived value is an average value determined using:

$$va = k*Ta + (1-k)*vae,$$

where va is the average value, vae is an earlier corresponding average value, Ta is the actually measured temperature value, and k is an averaging coefficient with $0 < k \leq 1$.

13. The apparatus according to claim 12, comprising correcting means for correcting the output signal with reference to said temperature signals using the derived value.

14. The apparatus according to claim 12, comprising means for outputting the output signal and the obtained temperature signals and/or one or more derived values derived from the temperature signals.

15. The apparatus according to claim 12, comprising one or more temperature sensors for rendering said temperature signals.

16. The apparatus according to claim 12, comprising interrogating means for repeatedly interrogating a temperature sensor for obtaining said temperature signals.

17. The apparatus according to claim 12, comprising at least one averaging means for forming the average value.

18. The apparatus according to claim 17, in which the averaging means comprises a register for holding an earlier average value, and a calculator determining the actual average value from the actual temperature signal and the earlier average value.

19. The apparatus according to claim 12, comprising an ASIC and a sensor element.

20. The apparatus according to claim 12, comprising transformation means for determining the temperature from said corrected signal.

21. The apparatus according to claim 12, wherein the apparatus is a sensor with a sensor element, an ASIC, a housing, a radiation permeable window and terminals.

22. The method according to claim 12, wherein the temperature signals are acquired at two or more different locations and with two or more different time references, and correction is made with reference to said acquired temperature signals.

23. The method of claim 22, wherein differences are formed in a pair-wise manner amongst the acquired temperature signals, and the differences are added with a weighting applied to them.

24. The method of claim 22, wherein the acquired temperature signals are added with a weighting applied to them.

25. The method according to claim 1, wherein at least one temperature signal relating to the temperature of the sensor or relating to one or more components of the sensor is obtained from a measurement outside the sensor.

* * * * *